Jan. 10, 1933.                    W. A. WILHELM                    1,893,854
                                   CAKE STRIPPER
                            Filed Aug. 11, 1930        7 Sheets-Sheet 1

Jan. 10, 1933.   W. A. WILHELM   1,893,854
CAKE STRIPPER
Filed Aug. 11, 1930   7 Sheets-Sheet 4
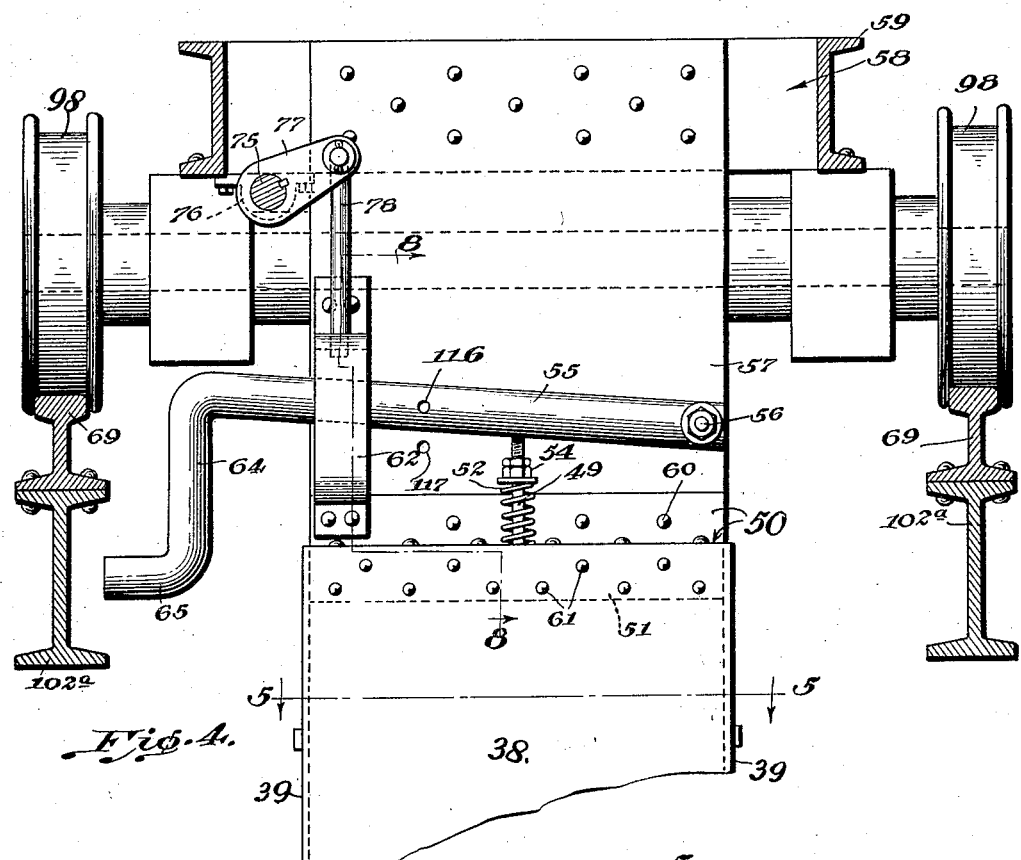
Fig. 4.
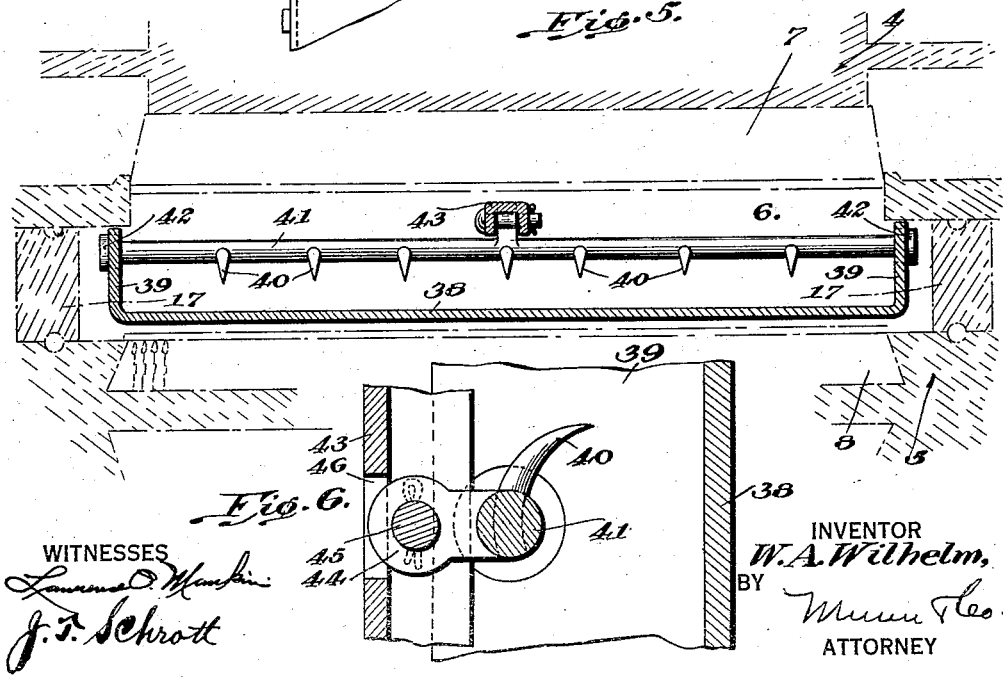
Fig. 5.
Fig. 6.
WITNESSES
INVENTOR
W. A. Wilhelm,
BY
ATTORNEY Jan. 10, 1933.   W. A. WILHELM   1,893,854
CAKE STRIPPER
Filed Aug. 11, 1930   7 Sheets-Sheet 5
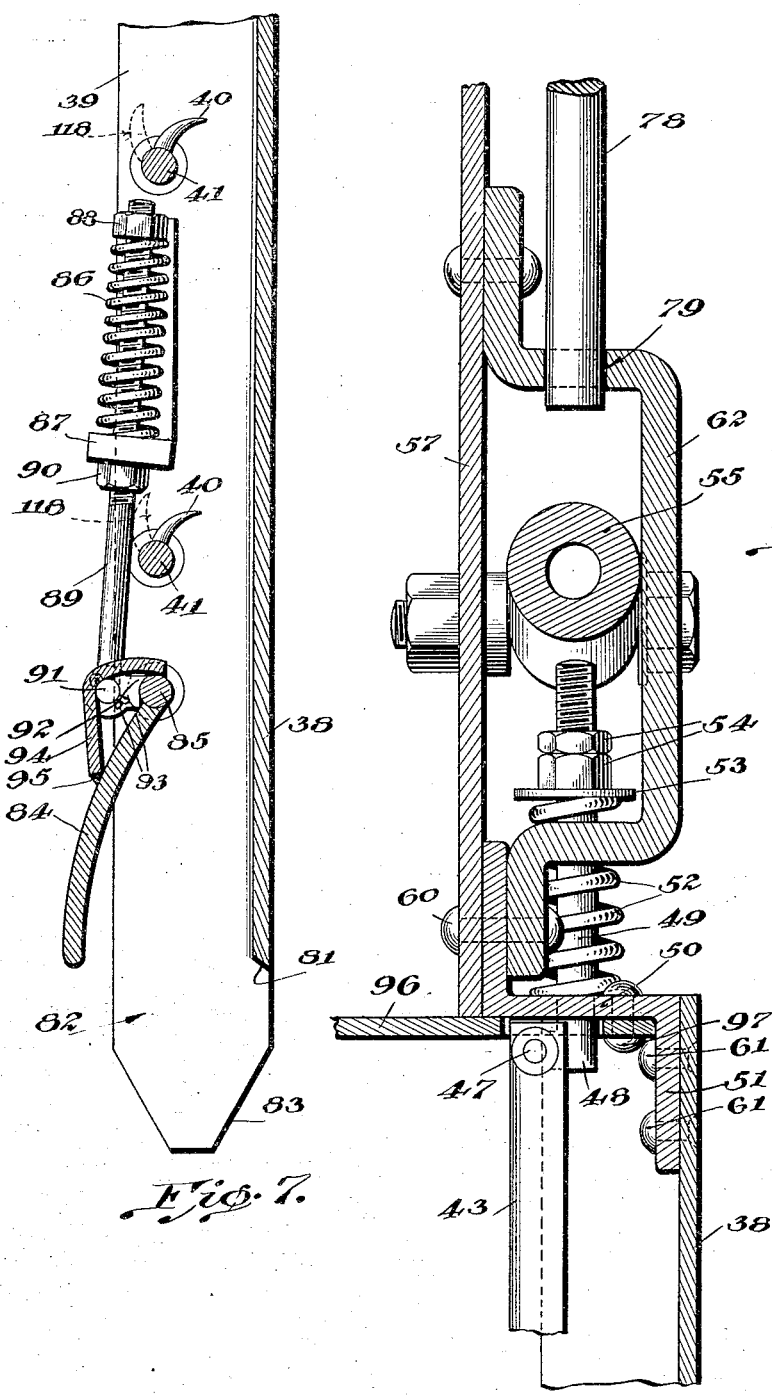

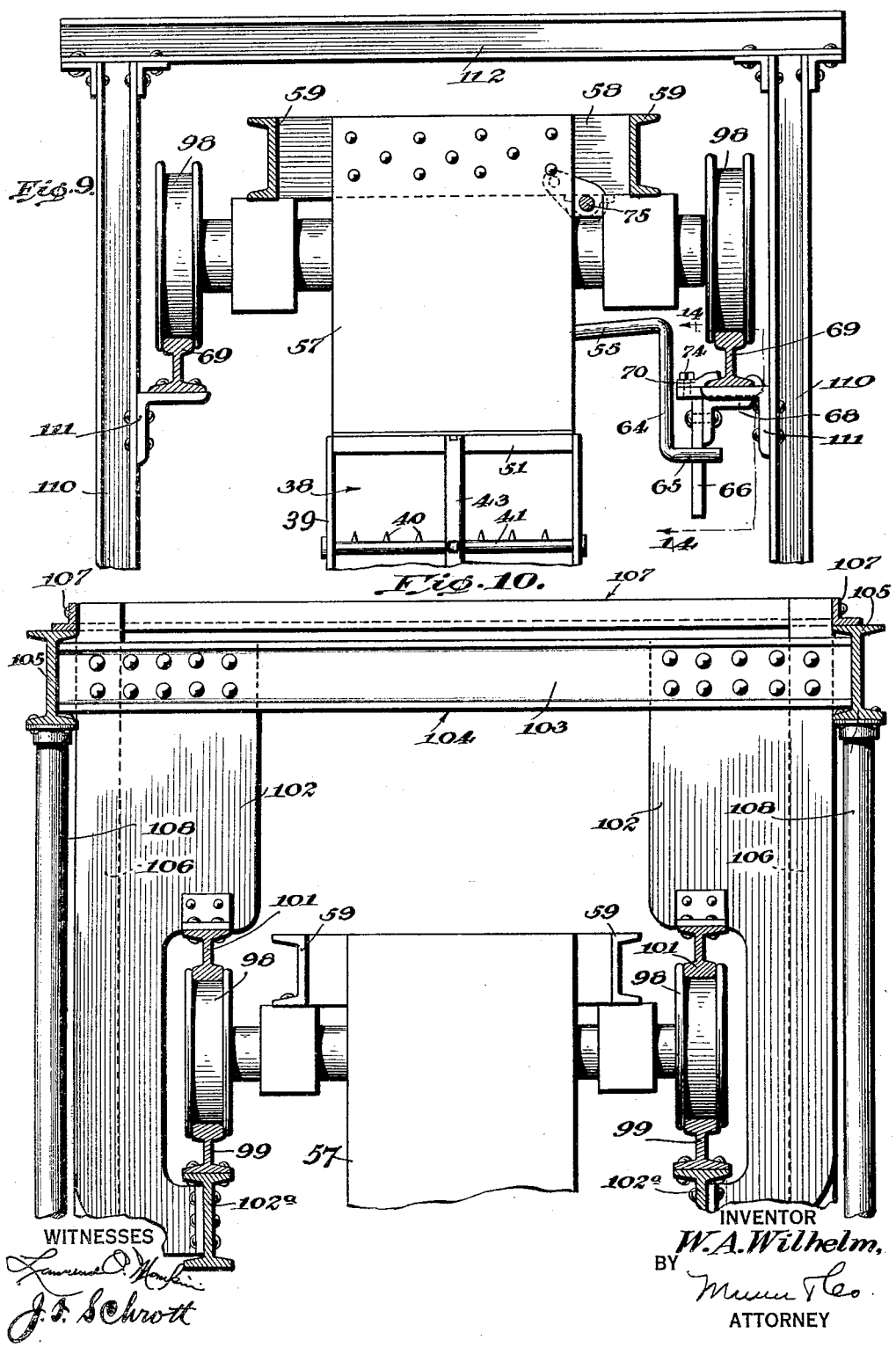

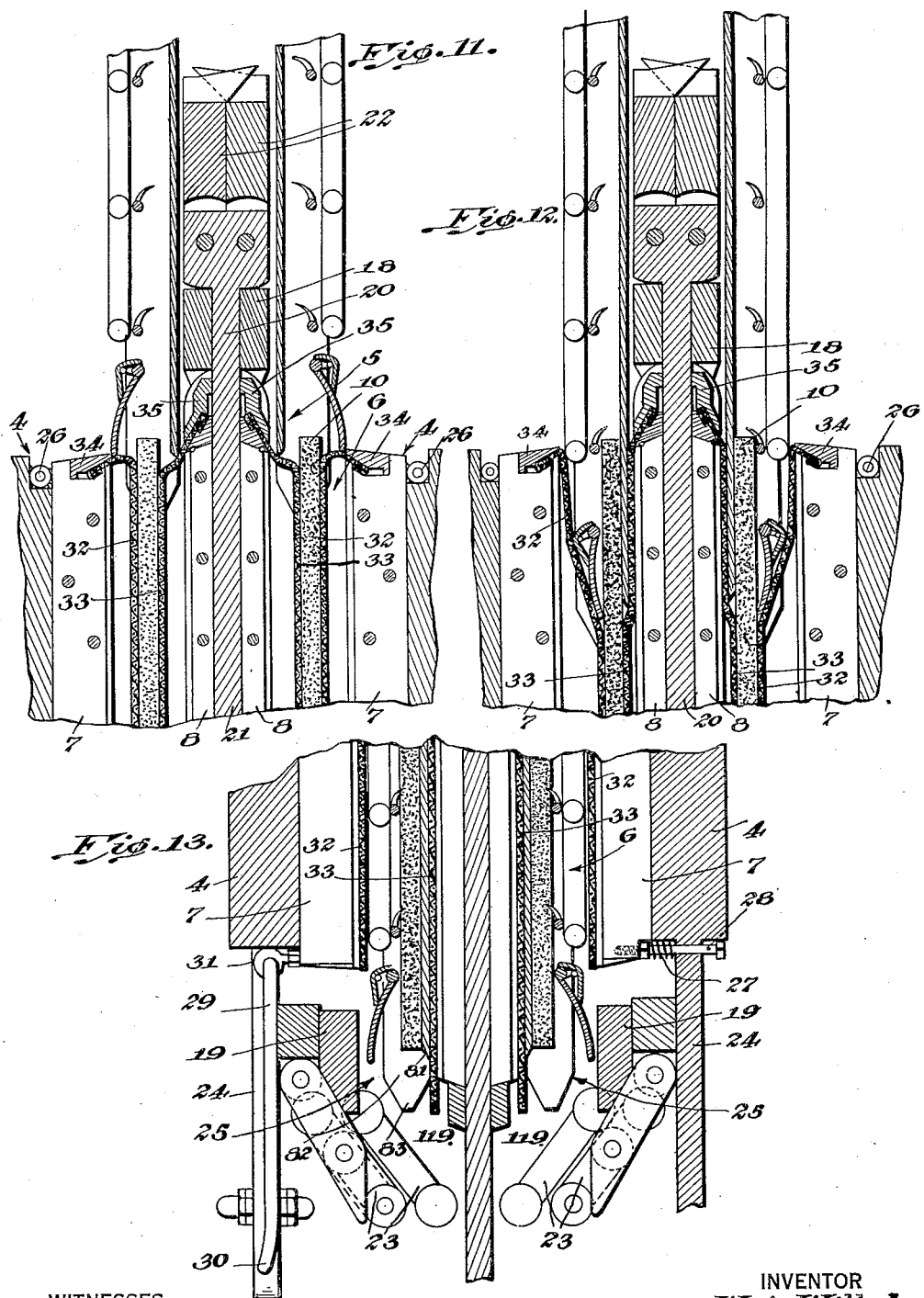

Patented Jan. 10, 1933

1,893,854

UNITED STATES PATENT OFFICE

WILSON A. WILHELM, OF VERNON, TEXAS

CAKE STRIPPER

Application filed August 11, 1930. Serial No. 474,604.

This invention relates to improvements in cake strippers, and it consists of the constructions, combinations and arrangements herein described and claimed.

An object of the invention is to provide a cake stripper to be used in conjunction with a press for extracting liquid from liquid-bearing material, for example, cotton seed meal or meats, to which end it is intended to replace manual labor in reaching into the press and separating the dry or finished cakes from the press cloths, leaving these in the press and the cakes free for discharge.

A further object of the invention is to provide a device which will strip the cakes from the press cloths on a perfectly uniform order, and by virtue of being arranged to have its components enter the press boxes for the accomplishment of the purpose, enables leaving the press cloths in the press thus avoiding the abuse to which the press cloths are customarily subjected when manually loosened from the cakes following the removal of the latter from the press after the act of extraction.

A further object of the invention is to provide a device capable of simultaneously stripping all of the cakes from the adhering press cloths of a press thus not only speeding this particular operation but expediting the recharging of the press for a subsequent extraction.

A still further object of the invention is to provide a cake stripper which constitutes one of the elements of a system for handling liquid-bearing substances, said stripper being an essential part of the system to the end that it alternates with a certain meal carriage in causing the removal from the press of the compressed cakes which were previously introduced as liquid-bearing loose stock by said carriage.

A still further object of the invention is to combine a stripper with a press in such a manner that it can readily be brought to position over the press upon the opening of the latter to expose the upper ends of the compressed cakes, thereupon to reach into the press boxes preparatory to gripping the cakes, and in doing so to regularly and easily strip the cakes from the adhering press cloths.

Other objects and advantages will appear in the following specification, reference being had to the accompanying drawings in which Figure 1 is a front elevation of the cake stripper, particularly illustrating its relationship to the press with which it is operatively combined.

Figure 4 is a section taken on the line 4—4 of Figure 2, particularly illustrating the stripper carriage.

Figure 5 is a cross section taken on the line 5—5 of Figure 4, the stripper component being illustrated as though in position in one of the press boxes.

Figure 6 is a detail vertical section taken on the line 6—6 of Figure 3, illustrating the connection of one of the claw shafts with the common connecting tension ad release bar.

Figure 7 is a vertical section taken on the line 7—7 of Figure 3, particularly illustrating the fixed and movable stripper blades.

Figure 8 is a vertical section taken on the line 8—8 of Figure 4, particularly showing the resilient mounting of the foregoing common release bar.

Figure 9 is a vertical section taken on the line 9—9 of Figure 1.

Figure 10 is a vertical section taken on the line 10—10 of Figure 1, particularly showing the details of the carriage elevator.

Figure 11 is a detail vertical section illustrating the initial step of presenting a pair of the stripper components to the open press.

Figure 12 is a similar view illustrating the stripping act well under way.

Figure 13 is a similar view illustrating the completion of the stripping act and the position of the stripper components preparatory to extracting the cakes.

Figure 14 is a section taken on the line

14—14 of Figure 9, particularly illustrating the trip by which the finished cakes are automatically released.

The herein disclosed cake stripper is intended to work in conjunction with the press for extracting liquid from liquid-bearing substances disclosed in an application filed by Wilson A. Wilhelm, August 11, 1930 Serial No. 474,602, otherwise known as Case No. 1. In order that the purpose of the cake stripper may be understood it is deemed preferable to describe the correlated parts of the press without making it necessary to refer to Case No. 1.

Figure 1:
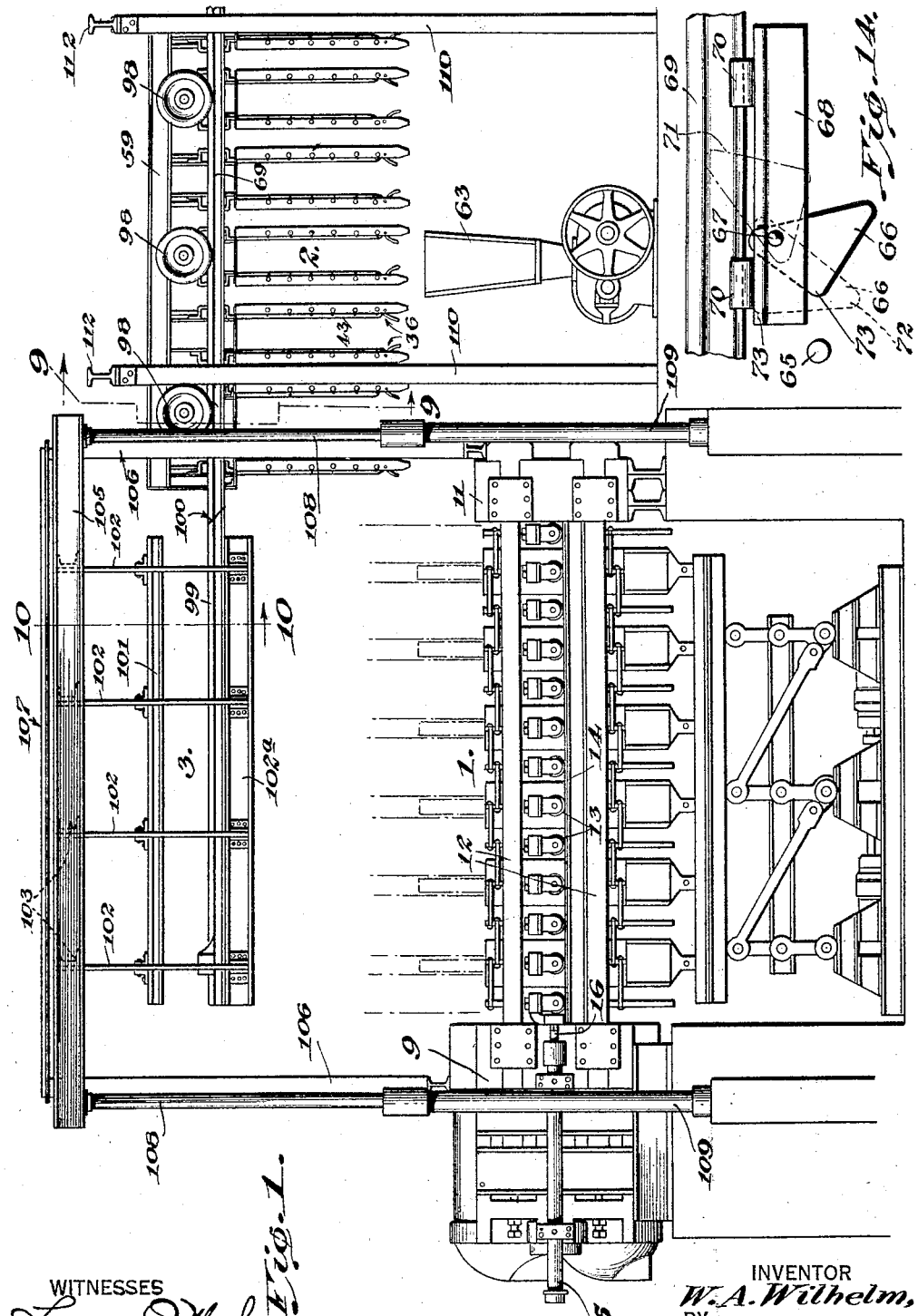

Figure 1 illustrates the general arrangement of the press 1, cake stripper 2 and elevator 3, the structure of the last two elements being the specific subject of this application although there is a combination between all three of the elements as is brought out later. The press comprises a series of entering heads 4 and press boxes 5 (Fig. 5) which are best known as male and female press members or units.

These members define compartments 6 between them (Fig. 5). The sides of these compartments are formed by drainage heads 7, 8 respectively on the male and female press units. When these units are moved together in the so-called closing of the press by action of certain rams in a cylinder block 9 (Fig. 1) the stock with which the components 6 were previously charged is compressed so that the liquid is forced to flow through vertical channels in the drainage heads whereby the stock becomes reduced to cakes 10 which it is the purpose of the stripper 2 to remove.

A head block 11 acts as an abutment for the series of press units. These units are kept in line by columns 12 which tie the cylinder and head blocks 9, 11 together. Each of the units has a pair of rollers 13 running on tracks 14, the arrangement in Figure 1 being duplicated on the unseen rear end. Each of a pair of reverse cylinders 15 has a piston rod 16 in connection with the first unit of the series, which in Case No. 1 happens to be what is known as a ram block.

Edge-closure means complete the compartments 6. Each set of closure means comprises edge walls 17 (Fig. 5), top end gates 18 (Fig. 11) and bottom end gates 19 (Fig. 13). The top end gates are appropriately hinged to the superstructure 20 of a web 21, in turn being the base or foundation of the press unit 5. These end gates are capable of being lowered and raised respectively to close and open the compartments 6, and when closed are locked in that position by key bars 22.

On a somewhat similar order the bottom end gates 19 (Fig. 13) are supported by rocker bars 23. When these are rocked a raising or lowering of the bottom end gates follows, respectively to assist in either closing or opening the compartments 6. When open, the bottom end gates are swung back (Fig. 13) against extensions 24 of the male press units 4. Spaces 25 are thus provided for the passage clear through of the components of the stripper 2.

This clear passage is established not only by the retraction of the bottom end gates but also by the function that the bottom end gates perform in preventing the canting of which the drainage heads 7 are capable. These drainage heads are hinged at 26 at the top (Fig. 11). Springs 27 (Fig. 13) tend to swing the heads 7 until limited by the heads of bolts 28 carrying the springs and working in holes in the extensions 24.

Canting occurs during the filling of the press 1 with liquid-bearing stock. Its purpose is to produce a uniform density in the stock as brought out in Case No. 1. When pressure is applied the drainage heads 7 gradually slide back against the entering heads 4. Canting is permissible by the springs 27 when the edge walls 17 (Fig. 5) and bottom end gates 19 (Fig. 13) are closed. When the bottom end gates 19 are subsequently opened (Fig. 13) in common with the edge-closure means preparatory to extracting the finished cakes 10, said bottom end gates hold the drainage heads 7 back and prevent them from being canted in the following manner:—

Levers 29 (Fig. 13) have pivotal connections at 30 with each extension 24 and with eye bolts 31 carried by the respective drainage heads 7. These levers swing on their pivots when the springs 27 are free to rock the drainage heads 7 to the canted positions. But when the bottom end gates 19 are swung down and back to the open position (Fig. 13) the levers 29 are pressed back level with the nearest faces of the extensions 24, thus holding the drainage heads 7 upright against the entering heads 4. The drainage heads 7 are thus prevented from reassuming the canted positions and from interfering with the passage through of the components of the stripper 2.

Press cloths 32, 33 (Fig. 11) cover the faces of the drainage heads 7, 8. The respective sides of drainage heads are of different lengths (Fig. 13), and the press cloths 32, 33 are made to correspond. The press cloths 33 thus hang down well into the spaces 25 (Fig. 13). The press cloths are suspended at the tops by clamping means 34, 35 above the respective drainage heads 7, 8 (Fig. 11) and merely hang down over the faces of the drainage heads. They constitute filtering means through which the liquid is pressed prior to reaching the vertical channels of the drainage heads.

The press cloths are only as wide as the drainage heads 7, 8 in the front to rear direction (Fig. 5). Since they have no attachment other than the clamping means 34, 35 (Fig. 11) it is a consideration to so strip the cakes 10 therefrom that the press cloths will be laid back smoothly (Fig. 12) against the faces of the drainage heads 7, 8 during the act of stripping. The work is done uniformly. The press cloths are never taken from the press (until ultimate renewal is required) and are subjected to the least possible injury.

Here is a great advantage over the prevailing practice according to which the stock is completely wrapped in large pieces of press cloths. This is done outside of the press, and the wrapped stock is inserted into the compartments of the press by hand. Stripping of the cakes is done after again removing them and the press cloth wrappings from the press by hand. In doing the stripping, use is made of tools which attach the press cloths in a very uneven and destructive manner. The result is a premature destruction of the press cloth and a consequently extravagant running expense.

The cake stripper, both as to a structure and function, will now be considered. It comprises a series of components which are arranged in pairs 36 (Fig. 2), there being single or individual components 37 on the left and right ends. All of these components are identical, with the exception of the foregoing arrangement, and for that reason the later description is temporarily confined to only one.

The purpose of arranging the components in end singles and intermediate pairs is to suit the arrangement of the cake compartments 6 of the press. Another purpose is to insure the clearance of the upstanding top end gates 18 and key bars 22 (Fig. 11) when these are in the upright or open position.

The companent 36 (now making reference to only one) comprises a blade 38 (Figs. 5 and 7) that is bent up at 39 along the vertical edges (Fig. 5) to produce side flanges. The form of the stripper component is that of a broad, shallow trough. It is much on the order of a shovel that is intended to reach into the cake compartment 6 (Fig. 11) and obtain the finished cake 10, although for that purpose the component is equipped with a plurality of claws 40 which are designed to grip the cake (Fig. 13) for its extraction.

The trough is deep enough to contain the finished cake 10 (Fig. 13) as well as to carry a plurality of parallel shafts 41 within the confines thereof (Fig. 5). These shafts carry the claws 40 (Fig. 6), hence the arrangement is that of a plurality of series of claws across the trough at sufficiently frequent intervals to insure a firm grip on the cake.

These shafts are journaled at the ends in appropriate bearings 42 (Fig. 5) comprising, for example, short bushings welded to the side flanges 39. End movement of the shafts is prevented by a bar 43 (Fig. 2) which has common pivotal connection with each of the cranks 44 (Figs. 3 and 6) of the various shafts 41. The bar is U-shaped in cross section thus to receive the otherwise free end of the crank 44 (Fig. 6) and provide a mounting for the pivot 45. The base of the U is cut out at 46 to make room for the crank. The upper end of the bar is pivoted at 47 (Fig. 8) to the bent or L end 48 of a bolt 49 which comprises part of a resilient mounting. Since the bolt is guided for movement in one position it follows that the bar 43 will be kept in a substantially vertical position and that there will be little likelihood of any movement of the shafts 41, although these may, in practice, be supplemented with any known arrangement for preventing any movement should the bar 43 prove insufficient.

Thus far it will be understood that turning motion imparted to the lowermost shaft 41 (Fig. 12) of the series by virtue of the first series of claws 40 coming in contact with the cake 10, will be communicated to all of the shafts 41 by the bar 43 which comprises the common connector. The chief purpose of the bar 43 is that of a release, although it is also a tension bar, serving to keep all of the claws 40 in the gripping position (Fig. 13) after the cake 10 has once been caught.

To these ends that portion of the bolt 49 (Fig. 8) extending above (Fig. 4) the mid-web 50 of a Z bar 51 carries a spring 52 which presses between the mid-web and a washer 53 on the bolt, thus tending to hold the upper end of the bar 43 against the nether side of the mid-web 50 (Fig. 8). The result is an upward rocking of all of the cranks 44 and a normal extension of the claws 40 (Fig. 11) more nearly toward the plate 38. Nuts 54 (Fig. 8) on the threaded end of the bolt 49 provide an adjacent abutment for the washer 53.

Figure 2:
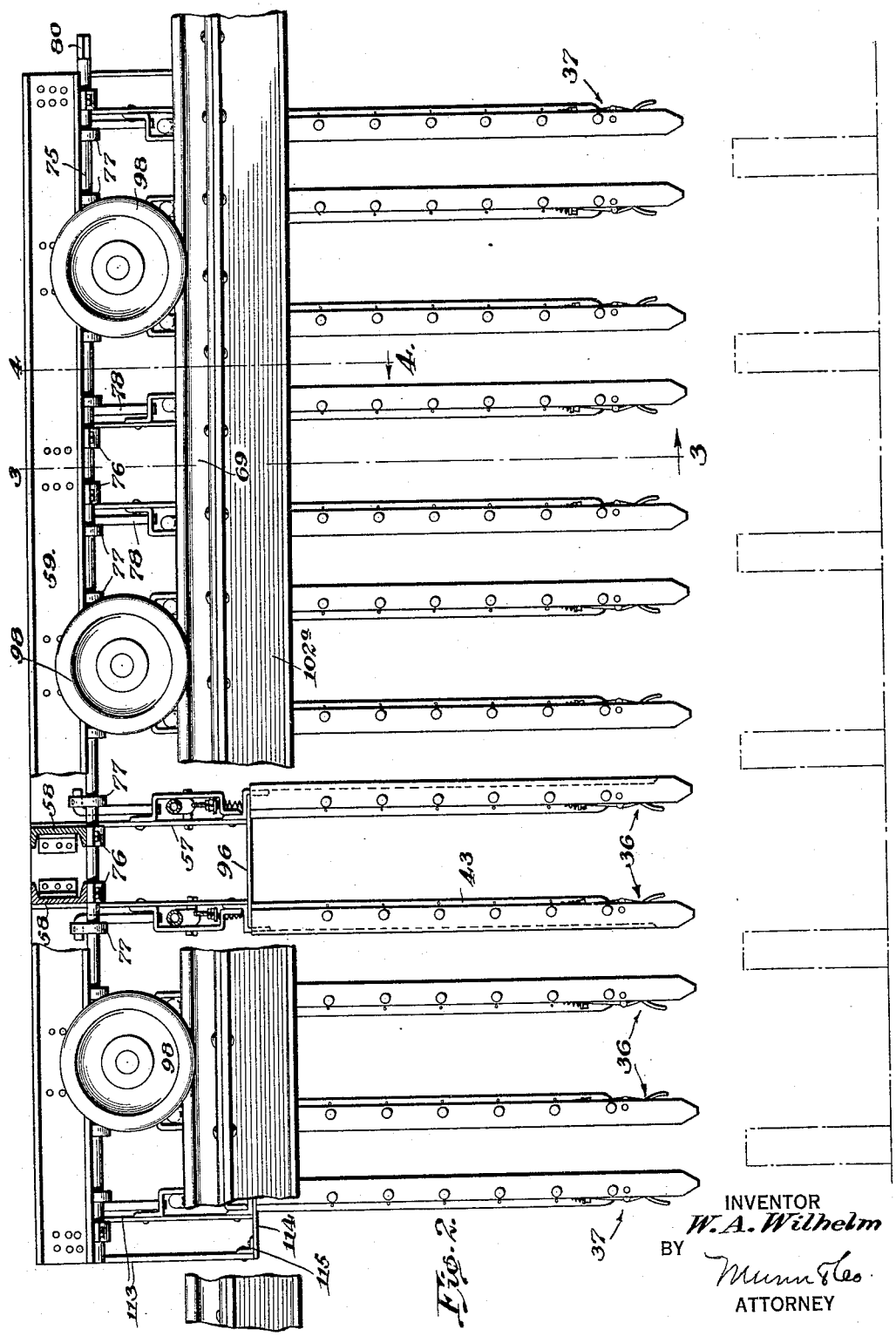
Figure 2 is a front elevation of the cake stripper, parts being broken out to reveal internal structure.

Directly over the upper end of the bolt 49 there is a lever 55 which is intended to be worked either by hand or mechanical means to release the cake 10. It is pivoted at 56 (Fig. 4) to a suspension plate 57. It is by this plate that the component 36 is suspended from a cross channel 58 forming part of a carriage 59 (Fig. 2). One flange of the foregoing Z bar 51 is riveted or otherwise secured at 60 to the bottom of the suspension plate (Figs. 4 and 8). The blade 38 is riveted or otherwise secured at 61 to the other flange of the Z bar.

A guard 62 (Figs. 4 and 8) receives the free end of the lever 55. The lever is movable up and down in the guard, and when it is moved down it presses on the end of the bolt 49, compressing the spring 52 and causing a common outward rocking of all of the shafts 41 so that the cake 10 (supposedly extracted from the compartment 6) will be released either for dropping onto a floor truck or into a cake breaker 63 (Fig. 1).

Manual operation of the lever 55 to release the cake 10 can be accomplished by simply reaching up under the structure and pulling down on the lever. Ordinarily the cakes 10 will be released singly, that is to say, they will be dropped into the compartment 63 one by one. The carriage 59 will be rolled along to bring the successive components 36, 37 into position over the breaker. But by preference, mechanical means will be employed to release or drop the cakes 10 singly, and the means for accomplishing this is as follows:—

At its free end the lever 55 is bent down at 64 (Fig. 4) and out at 65 to end in a pin. This end coacts with a triangular trip 66 that is pivoted at 67 near one of its corners (Fig. 14) to an angle bar 68 in turn secured to the flanges of a rail 69 by means of a pair of clamps 70.

Normally the trip 66 will hang down loose on its pivot 67 (full lines Fig. 14). Upon a movement of the carriage 59 to the right (Fig. 1) as when all of the compents 36, 37 are filled with cakes 10 following an extraction from the press 1, the pin ends 65 of the successive components will simply pass under the trip 66 by rocking it to the dotted line position 71 (Fig. 14). The clamps 70 are purposely spaced to make room for the upward swinging of the trip. But upon reversing the carriage 59, after moving it to the left, (Fig. 1) the successive pin ends 65 will move the trip to the dotted line position 72. The heel 73 of the trip then abuts the nearest clamp 70 and becomes a fixture. The pin ends 65 will ride down the incline of the trip, causing a depression of the lever 55 (Fig. 4) and a release of the cake from the respective stripper component.

It is thus evident that the release of the cakes 10 occurs automatically on the return movement of the carriage 59 toward the press 1. The release of the cakes can be made to occur at any desired point along the carriage travel, this being regulated by merely adjusting the position of the trip 66. The bolts 74 (Fig. 14) by which the clamps 70 are secured, will be loosened so as to enable sliding the clamps along the flange of the rail 69 thus bringing the trip 66 to the position where it will cause the desired dropping of the cakes.

Provision is also made for the simultaneous release of all of the cakes 10 regardless of the position of the carriage 59 when clear of the press 1. This provision comprises a lay shaft 75 (Fig. 2) which is appropriately journaled at 76 on the nether sides of the cross channels 58 (Fig. 2). This shaft has as many cranks 77 as there are stripper components 36, 37.

Each crank has a pivotally connected plunger 78 (Fig. 4) that operates in a hole 79 (Fig. 8) of the respective guard 62 in such a manner that when the plunger is depressed the lower end thereof will come in contact with the lever 55 and depress it likewise. The cake 10 will be released as before.

A square end 80 (Fig. 2) of the lay shaft 75 is intended to receive a crank (not shown) by which said shaft will be turned. Turning of the shaft depresses all of the plungers 78 at one time so that all of the cakes 10 will be released simultaneously. The provision of the lay shaft 75, and the consequent provision for the release of all of the cakes by manual means, does not interfere in the least with the automatic single release of the cakes that is accomplished by the trip 66.

The blade 38 is herein known as the fixed stripper blade. Its purpose is to separate the cake 10 from the cloth 33 (Fig. 12) next to the drainage head 8 of the press box 5. The leading edge of this blade is bevelled at 81 (Fig. 7) to facilitate the stripping action. The sides or flanges 39 are extended some distance beyond the leading edge 81, as at 82 (Fig. 7), and are pointed at 83 to act as feelers or pilots to guide the respective stripper component into the compartment 6 of the press. Should the stripper components be slightly out of registration with the compartments 6 beneath them the pointed ends 83 will merely strike against adjoining metal parts and deflect the components sufficiently to cause them to enter the compartments as they are lowered. The result is an automatic shifting of the carriage 59 in either direction until the stripper components are centered in respect to the compartments 6.

Figure 3:
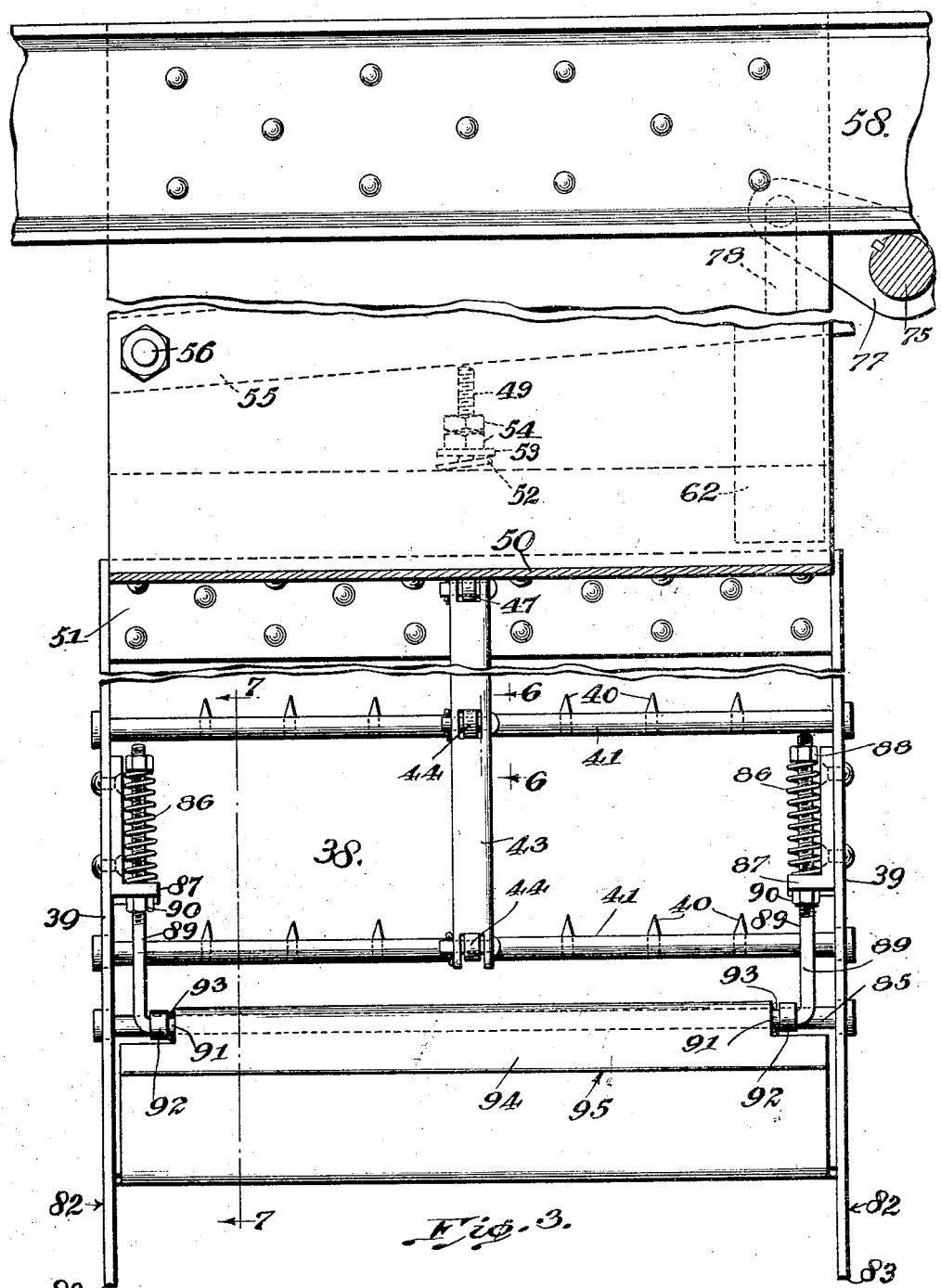
Figure 3 is a vertical section taken on the line 3—3 of Figure 2, particularly illustrating one of the stripper components from which parts are broken out to enable showing the structure on a large scale.

A movable stripper blade 84 (Fig. 7) acts in conjunction with the stripper blade 38 (Fig. 12) but to separate the cloth 32 from the cake 10 on the entering head 4 side. Each stripping blade 84 is secured to a shaft 85 which is mounted similarly to the claw shafts 41 (Fig. 3). This blade is controlled by springs 86 (Fig. 3). The springs are mounted between brackets 87 and the adjustable nuts 88 on rods 89 which carry them. The rods are guided by the brackets, and they carry additional nuts 90 which act as stops to limit the expansion of the springs, hence the degree of extension of the stripper blade 84.

The bent ends 91 (Fig. 3) of the rods 89 are pivotally connected with arms 92 extending from the shaft 85. Cotter pins 93 or the like (Fig. 3) prevent the bent ends from slipping out. A guard 94 (Fig. 7), welded to the blade 84 at 95, extends out flush with the rounded ends of the arms 22 and 44 and prevents the tearing of the press cloths (Fig. 12) during the stripping action.

Were it not for the guard 94 the outstanding arms 92 and 44 would channel or score the press cloths 32 and soon wear them out.

But by having the guard 94 extend out to the position of the ends of the arms the press cloths are held away from the arms so that no wear can occur. The springs 86 keep the blade 84 extended (Fig. 7) when out of range of a press cloth 32. Shortly after the edge of the blade engages the top of the press cloth (Fig. 11) the resistance of the press cloth will cause the blade to swing in against the tension of the springs 86 (Fig. 12) and assume the stripping position next to the side of the cake 10.

A plate 96 (Fig. 2), spans the distance between each pair of components 36 and ties the troughs together at the top. For this purpose the plates 96 are riveted or otherwise secured at 97 (Fig. 8) to the mid-webs 50 of the Z bars 51. The suspension plates 57 are thus prevented from any noticeable vibration and are stabilized at the bottom. The carriage 59, to which reference has been made, includes a plurality of wheels 98 (Fig. 2) which run on the previously mentioned rails 69. These rails have extensions 99 (Fig. 1) comprising part of the elevator 3. The confronting ends of the rails are bevelled at 100 so that the rails 69 may act as a stop to limit the raising movement of the elevator as well as to insure the registration of the rails when the elevator is in the raised position. The wheels 98 are mounted upon the carriage 59 in any appropriate manner.

The extension rails 99 of the elevator 3 as well as guard rails 101 (Figs. 1 and 10) are carried by suspension members 102 which are secured at the top to cross channels 103 that form part of a framework 104. The rails 99 are attached to I-beams 102ª which, in turn, are directly connected with the suspension members. This framework includes longitudinal I-beams 105 to which the ends of the cross channels are appropriately secured. This framework is guided in its vertical movements by fixed standards 106. These standards are tied together at the top by angles 107.

Vertical movements of the frame 104 are produced by rams 108 which work in upright cylinders 109. These rams occur at the four corners of the framework 104, and when pressure fluid is either admitted to or is released from the cylinders the rams will be raised or lowered simultaneously thus to elevate or lower the framework 104. Since the only occasion for the lowering of the framework is the stripping of the cakes 10 from the press cloths (Fig. 12), it follows that the carriage 59 was previously run on to the track extensions 99 in order to bring the stripper components into position over the compartments 6.

Reverting to the rails 69 (Fig. 1) it is to be observed that these are supported by standards 110 and are connected with the latter by angle brackets 111 (Fig. 9). Suitable cross ties 112, for example in the nature of I-beams as shown, are connected with the upper ends of the standards 110 to prevent the latter from spreading as well as to generally stabilize the structure. In practice the rails 69 may extend as far to the right of Figure 1 as may be deemed necessary. Any number of pairs of standards 110 will be added to meet the requirements of the extended rails. Thus far it will be understood that the rails 69 are fixed while their extensions 99 are vertically movable.

The suspension plates 57 (Fig. 2) are provided in pairs for the pairs of components 43 and are also provided in pairs for the single components 37 (Fig. 2) although here these plates are differentiated by the numeral 113. The end component 37 (making reference to the one at the left of Fig. 2) depends from a plate 114 which is to be identified with the plates 96 of the component pairs. The component 37 is made to depend from one side of this plate. The other side of the plate is secured to the outermost suspension plate 113 by means of an angle bar 115, this arrangement adequately preventing the lateral vibration of the component 37.

Provision is made for retreating the claws 40 so that their gripping function will be suspended when the respective component is let down into the compartment 6 for the stripping of the press cloths from the cake 10. Although this provision may take any of a variety of forms, the simplest arrangement would be to drill the lever 55 (Fig. 4) and the suspension plate 57 with holes 116, 117 that will match in the depressed position of the lever so that a bolt can be secured through to hold the lever down permanently.

Under this condition the automatic and manual releasing functions, respectively made possible by the trip 66 (Fig. 14) and the lay shaft 75 (Fig. 2), will be suspended, as will also the function of the claws 40. The series of shafts 41 will be held in the turned positions thus to keep the claws 40 approximately in the position 118 (Fig. 7). The claws will thus be completely out of range of the cake faces. Upon lowering the stripper into the press the blades 38, 84 will simply strip the cloths 32, 33 from the cakes 10 leaving the cakes free to drop out through the unobstructed bottom passages 119 (Fig. 13).

It is to be observed that these passages 119 are made clear and unobstructed when the bottom end gates 19 are thrown back against the extensions 24 of the entering heads 4. It was previously stated that the stripper constitutes one of the elements of a system for handling liquid-bearing substances. This system is disclosed in the press application previously mentioned.

According to the working of the system it is contemplated to employ the stripper either for the extraction of the cakes 10 from the top of the press or to permit them to fall through the open bottom passages 119 (Fig. 13). For the first purpose the claws 40 are needed, but for the second purpose the claws are retreated to an inoperative position, leaving the blades 38, 84 (Fig. 7) free to strip the cakes. When the cakes are thus stripped they will fall through the passages 119 either into or onto any suitable contrivance for carrying them away or otherwise disposing of them. The operation is readily understood. The press 1 (Fig. 1) is periodically opened (Fig. 11) so as to expose the finished cakes 10. These cakes are surprisingly hard when all of the liquid has been pressed out. Upon the separation of the entering head and press box units 4, 5, which is the same as opening the press, the initial partial stripping (Fig. 11) of the cakes 10 from the press cloths 32, 33 will elevate the cakes slightly in the compartments 6.

The upper parts of the press cloths are thus advantageously exposed to the fixed and movable stripper blades 38, 84. These blades assume their stripping positions when the carriage 59 (Fig. 1) is rolled from the position in Figure 1 to that in Figure 2. The rolling is done by hand, although it may be done otherwise. When the carriage moves off of the rails 69 (Fig. 1) onto the extensions 99 it immediately becomes susceptible to being lowered because the extensions 99 are part of the elevator 3.

Lowering of the stripper 2 is accomplished by releasing the pressure fluid from the cylinders 109. If it is desired to extract the cakes 10 from the top of the press 1 the claws 40 will be left to assume the inwardly extended positions (Figs. 7 and 11). If it is decided to let the cakes 10 drop through the bottom of the press by way of the passages 119 (Fig. 13) the claws 40 will be retracted (dotted lines 118 Fig. 7). This is done by depressing each of the levers 55 (Fig. 4) and bolting them down through the matching holes 116, 117.

In either event the stripping action will be as follows:—The fixed blade 38 will move down close to the face of the adjacent drainage head 8 (Figs. 11 and 12). The resistance of the press cloth 32 will cause the blade 84 to move on its pivots so that the leading edge turns into the trough between the face of the cake 10 and the cloth 32, and in doing so will bodily move the cake with its adhering cloth over against the blade 38 so that the position in Figure 12 is assumed. The adjacent drainage head then acts as an abutment.

As the stripper 2 continues lowering, the blades 38, 84 will simply move between the cake faces of the adhering press cloths 32, 33, separating the latter until they hang perfectly free in the compartment 6. By this time (Fig. 13) the claws 40 will assume the ultimate gripping position. In going down, the claws are simply moved back on their pivots, the tension of the spring 52 (Fig. 8) not being great enough to hold the claws so rigidly that they will score the face of the cake.

When the cloths have been completely separated, the loose cake 10 will tend to slip down and in doing so tend to reverse the claws to some extent so as to prevent the cake from slipping out at the bottom. Upon now raising the elevator 3 the inertia of the cake 10 will be the factor that enables the claws 40 to so bury themselves into the cake that the latter cannot slip and consequently will be extracted from the compartment 6. When the elevator 3 reaches its original position (Fig. 1) the carriage 59 is moved to the right over the rails 69 until the last component 37 at the left clears the breaker 63.

The carriage 59 is now rolled back toward the left. As the pin end 65 (Fig. 4) of the lever 55 of each stripper component engages the trip 66 (Fig. 14) and moves it to the dotted line position 72, the trip is converted into a cam which will cause the pin end 65 to ride down, whereupon the lever 55 depresses the bolt 49 (Figs. 4 and 8), thereby rocking all of the shafts 41 to the left (Fig. 7) and freeing all of the claws from the cake so that the latter can drop.

This releasing action is automatic. The cakes 10 are released one by one. Should it be desired to release all of the cakes simultaneously, the operator would place a crank on the square end 80 (Fig. 2) of the lay shaft 75 and give the latter a turn so as to simultaneously depress all of the levers 55 (Fig. 4) by means of the depending plungers 78. There is one of the plungers over each of the levers 55 of the successive stripper components.

In case it should be desired to drop the finished cakes 10 out of the bottoms of the compartments 6, (Fig. 13), the various levers 55 would be bolted down or otherwise secured in the depressed position, thus holding all of the claws 40 in the retracted or retreated positions 118 (Fig. 17) so that when the stripper blades 38, 84 have passed completely by the bottom of each cake 10 there will be nothing to prevent the latter from slipping on through the passages 119 into any suitable receptacle provided for its transportation away from the press.

While the construction and arrangement of the improved stripper is that of a generally preferred form, obviously modifications and changes may be made without departing from the spirit of the invention or the scope of the claims.

I claim:—

1. The combination of a pair of suspended elements supporting an adhering cake therebetween, and means insertible between said elements and both sides of the cake to strip the cake from said elements.

2. The combination of a pair of suspended elements supporting an adhering cake therebetween, means to pass between said elements and both sides of the cake to strip the cake from said elements, and means to then grip the cake.

3. The combination of a pair of suspended elements supporting an adhering cake therebetween, combined stripping and gripping means, and means carrying said combined means for passing said combined means along the cake respectively to strip the cake from the elements then grip the cake for extraction.

4. The combination of a press having confronting drainage heads, cloths covering the faces of the heads and defining the sides of a compartment containing a cake adhering to the cloths, and means movable into the compartment between the cloths and sides of the cake to separate the cake from the cloths.

5. The combination of a press having confronting drainage heads, cloths covering the faces of the heads and defining the sides of a compartment containing a cake adhering to the cloths, means movable into and out of the compartment between the cake and cloths to strip the cake from the cloths, and gripping means dormant on the inward movement but active on the outward movement to grip and extract the cake from between the cloths.

6. A press comprising spaced, confronting drainage heads, press cloths suspended to cover the faces of the heads and define the sides of a compartment containing a cake adhering to the cloths, an end gate forming part of edge-closure means for the compartment, being displaceable to provide an open passage from the compartment; in combination, stripper blades movable into the compartment between the cloths and cake to separate the cake for discharge from the compartment through said passage.

7. The combination of a press having a cake compartment with suspended cloths to support an adhering cake, an elevator mounted on the press, stripper means for separating the cake and cloths, and a carriage for the stripper means being movable onto the elevator for introduction into the compartment for the purpose stated.

8. The combination of a press having a cake compartment with suspended cloths to support an adhering cake, an elevator movable toward and from the press, fixed rails with which the elevator registers when retracted from the press, a carriage movable from the rails onto the elevator, and stripper means carried by the carriage for introduction into the compartment upon movement of the elevator toward the press for the separation of the cake and cloths.

9. A stripper component comprising a blade, a shaft having claws, means to movably support the shaft adjacent to the blade to leave a cake space, means tending to move the shaft in one direction to engage the claws with a cake, and means to move the shaft in the opposite direction against the effort of the foregoing means either to render the claws initially inactive or to retract them from an engaging position to release the cake.

10. A stripper component comprising a blade having side flanges, a shaft having claws being movably supported by the flanges away from the blade to leave a cake space, resilient means tending to turn the shaft in one direction to engage the claws with the cake, and means to oppositely turn the shaft against the tension of said resilient means to retract the claws for the release of the cake.

11. A stripper component comprising a blade having side flanges, a shaft having claws being movably supported by the flanges away from the blade to leave a cake space, resilient means tending to turn the shaft in one direction to engage the claws with the cake, means to oppositely turn the shaft against the tension of said resilient means to retract the claws for the release of the cake, and means for securing said turning means to hold the shaft in the latter position thus maintaining an initial retraction of the claws.

12. A stripper component comprising a blade having side flanges, a plurality of shafts each having claws being movably supported by the flanges away from the blade to leave a cake space, cranks on the shafts, means connecting the cranks, and resilient means acting on the connecting means tending to keep all of the shafts turned in a position wherein the claws are extended toward the blade for the gripping of the cake.

13. A stripper component comprising a blade having side flanges, a plurality of shafts each having claws being movably supported by said flanges, common connecting means by which all of the shafts are simultaneously movable in either direction, means by which the connecting means is suspended including resilient means tending to hold the claws in an extended position toward the blade, and means movable against the suspending means to shift the latter and said connecting means against the tension of the resilient means and thereby displace the claws to a retracted position.

14. A stripper component comprising a blade having side flanges, a plurality of shafts each having claws being movably supported by said flanges, common connecting means by which all of the shafts are simultaneously movable in either direction, means by which the connecting means is suspended including resilient means tending to hold the claws in an extended position toward the blade, means movable against the suspending means to shift the latter and said connecting means against the tension of the resilient means and thereby displace the claws to a retracted position, and means to secure the movable means in its moved position thus to retain the claws in retracted position.

15. A stripper comprising a carriage movable in either of two directions, a stripper component attached to the carriage, gripper means for gripping a cake, and means operative between the gripper means on movement of the carriage in one direction causing a release of the cake.

16. A stripper comprising a carriage movable in either of two directions, a plurality of stripper components attached to the carriage, gripper means embodied in each component for gripping a cake, and means to successively actuate the gripper means upon movement of the carriage in one direction to cause a successive release of the cakes.

17. A stripper comprising a carriage movable in one direction, a plurality of stripper components attached to the carriage, gripper means embodied in each component for holding cakes during the transportation of the carriage in one direction, and means simultaneously operative upon all of the gripper means to simultaneously release all of the cakes at the destination of the carriage.

18. A stripper comprising a carriage, rails along which the carriage is movable in either of two directions, a plurality of stripper components suspended from the carriage, gripper means to grip a cake in each of the components during movement in one direction, a release trip associated with one of the rails being inactive during movement of the carriage in the foregoing direction but active on the return of the carriage, and means embodied in each component then being actuated to retract the gripper means for a successive release of the cakes.

19. A stripper comprising a blade having side flanges, a coacting blade, a movable mounting for said blade being supported by the said flanges, and means acting on said movable mounting tending to keep the leading edge of the respective blade away from the first blade.

20. A stripper comprising a blade having side flanges, a coacting blade, a shaft carrying said blade being journaled on the side flanges and having an arm, a rod pivotally connected with said arm, a bracket on one of the flanges receiving and guiding the rod, and resilient means acting on the rod and tending to keep the leading edge of the coacting blade in a retreated position from the first blade.

21. A stripper comprising a blade having side flanges, a coacting blade, a shaft carrying said blade being journaled on the side flanges and having an arm, a rod pivotally connected with said arm, a bracket on one of the flanges receiving and guiding the rod, resilient means acting on the rod and tending to keep the leading edge of the coacting blade in a retreated position from the first blade, and guard means disposed between the shaft and coacting blade, extending flush with the end of the arm thus preventing said end from tearing a press cloth.

22. A press having confronting drainage heads defining part of a cake compartment, press cloths suspended in the compartment over the faces of the heads, stripper means to separate the cloths from an adhering cake, said means including a stripper blade, and pointed side flanges being engageable with either drainage head to center the stripper means during passage into the compartment.

23. A stripper comprising a blade rectilinearly movable between a cake and the first of a pair of supporting filter cloths, a companion blade simultaneously movable between the cake and the second one of said pair of filter cloths, and a pivot on which said companion blade is swingable toward the cake by the resistance offered by said second press cloth to movement of the cake and first filter cloth toward the rectilinearly movable blade.

24. The combination of a press having a drainage head, a stripper to separate a cake from a pair of press cloths supported beside the drainage head, said stripper comprising a blade rectilinearly movable between the cake and the first one of said cloths which is disposed adjacent to the drainage head, a companion blade simultaneously movable between the cake and the second one of said filter cloths which is remote from the drainage head, and a pivot on which said companion blade is swingable toward the cake by the resistance offered by said second press cloth to movement of the cake, caused by the rectilinearly movable blade and the first press cloth, toward the drainage head which acts as an abutment.

25. The combination of a pair of suspended filter cloths supporting an adhering cake therebetween, a stripper component which is movable longitudinally of the cake beginning at the suspended ends of the press cloths, and means embodied in said component for separating the cloths from the cake so as to let the cloths hang free.

26. The combination of a pair of suspended filter cloths supporting an adhering cake therebetween, a stripper component which is movable longitudinally of the cake beginning at the suspended ends of the press cloths, means embodied in said component for separating the cloths from the cake so as to let the cloths hang free, and gripping means carried by said component becoming operative to grip the cake the moment it tends to slip down after having been loosened from the cloths.

27. The combination of a pair of suspended filter cloths supporting an adhering cake therebetween, a stripper component which is movable longitudinally of the cake beginning at the suspended ends of the press cloths, means embodied in said component for separating the cloths from the cake so as to let the cloths hang free, gripping means carried by said component becoming operative to grip the cake the moment it tends to slip down after having been loosened from the cloths, and means by which the gripping means can be held back so as to avoid gripping the cake and so enable the cake to drop upon having been freed from the cloths.

28. A stripper comprising means to separate a cake from a pair of filter cloths to which it is attached by adhesion, gripping means carried by the stripper, and means to move the stripper between the cake and cloths thereby to free the cake from the cloths and to move the stripper in the reverse direction from the cake causing the gripping means to become buried in the cake.

29. A stripper comprising a blade movable between a cake and a filter cloth adhering to one side thereof, the other side of the cake being opposite to a drainage head, movable means by which the blade is carried, and a pivot connecting the blade with said means, said blade being swingable on said pivot upon entering between the filter cloth and cake to urge the cake over toward the drainage head.

WILSON A. WILHELM.